(12) United States Patent
Jones

(10) Patent No.: US 6,307,610 B1
(45) Date of Patent: Oct. 23, 2001

(54) ALIGNMENT OF FERROELECTRIC LIQUID CRYSTAL DEVICES

(75) Inventor: John C Jones, Malvern (GB)

(73) Assignee: The Secretary of State for Defence in Her Britannic Majesty's Government of the United Kingdom of Great Britain and Northern Ireland, Farnborough (GB)

( * ) Notice: Subject to any disclaimer, the term of this patent is extended or adjusted under 35 U.S.C. 154(b) by 0 days.

(21) Appl. No.: 09/117,704

(22) PCT Filed: Feb. 26, 1997

(86) PCT No.: PCT/GB97/00531
§ 371 Date: Aug. 4, 1998
§ 102(e) Date: Aug. 4, 1998

(87) PCT Pub. No.: WO97/32236
PCT Pub. Date: Sep. 4, 1997

(30) Foreign Application Priority Data

Mar. 1, 1996 (GB) .................................................. 9604461

(51) Int. Cl.[7] .................. G02F 1/1337; G02F 1/141; C09K 19/02
(52) U.S. Cl. ......................... 349/133; 349/123; 349/175
(58) Field of Search ................... 349/123, 171, 349/172, 175, 177, 179, 182, 184, 185, 186, 133, 134

(56) References Cited

U.S. PATENT DOCUMENTS

| | | | |
|---|---|---|---|
| 4,997,264 | * 3/1991 | Coulson | 349/134 |
| 5,398,042 | * 3/1995 | Hughes | 349/94 |
| 5,528,394 | * 6/1996 | Yeoh et al. | 349/123 |
| 5,543,943 | * 8/1996 | Hanyu et al. | 349/20 |
| 5,754,264 | * 5/1998 | Bryan-Brown et al. | 349/123 |
| 5,917,570 | * 6/1999 | Bryan-Brown et al. | 349/129 |

FOREIGN PATENT DOCUMENTS 2 274 519    7/1994  (GB) .

OTHER PUBLICATIONS

Jones, J.C., "The Relationship Between the Smectic C Director . . . ", Ferroelectrics, vol. 178, No. 1–4, 1996, pp. 155–165.

Kanbe, J. et al., "High Resolution, Large Area FLC Display . . . ", Ferroelectrics, vol. 114, No. 1–4, 1991, pp. 3–26.

* cited by examiner

Primary Examiner—William L. Sikes
Assistant Examiner—Dung Nguyen
(74) Attorney, Agent, or Firm—Nixon & Vanderhye P.C.

(57) ABSTRACT

A liquid crystal device comprises a liquid crystal cell including a layer of ferroelectric smectic liquid crystal material contained between two walls bearing electrodes and surface treated to give both an alignment and a surface tilt to liquid crystal molecules. The material adopts a $C_2$ rather than a $C_1$ arrangement by arranging the surface pretilt $\xi$ and the ratio of azimuthal to zenithal anchoring energies $\beta/\alpha$ to give a positive energy difference $\Delta W_s$ for the liquid crystal director at the surface in the $C_1$ and $C_2$ states. Additionally the provision of a $C_2$ state may be enhanced by allowing the cell to cool from the isotropic phase to a temperature just below a smectic A to chiral smectic phase, then applying 50 Hz ac voltage in the range typically 0.1 to 5 volts rms. across the liquid crystal layer for about 90 seconds, then allowing the cell to cool to ambient temperature.

13 Claims, 8 Drawing Sheets

Fig.17.
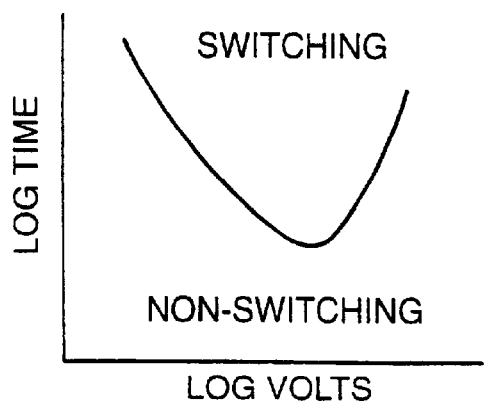
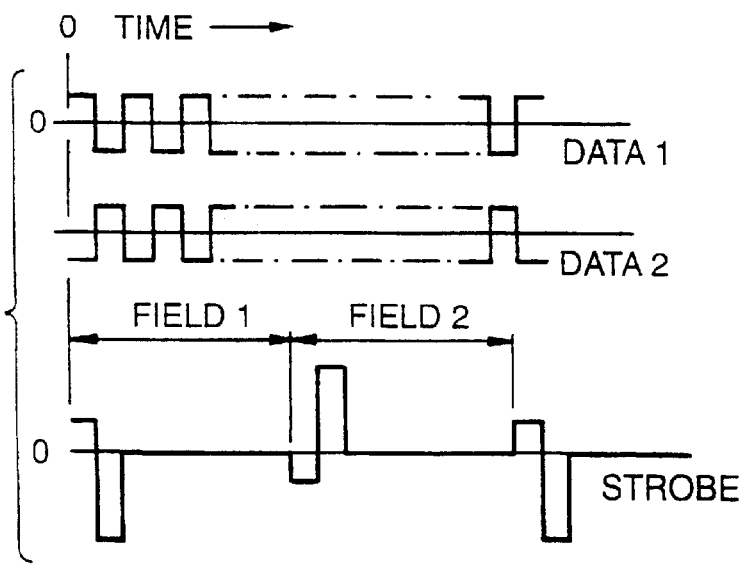
Fig.18.
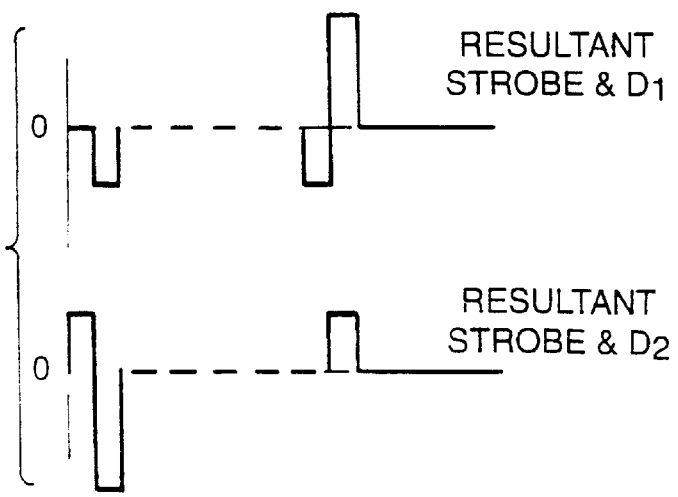
Fig.19.

ALIGNMENT OF FERROELECTRIC LIQUID CRYSTAL DEVICES

BACKGROUND OF THE INVENTION

1. Field of the Invention

This invention relates to the alignment of ferro electric liquid crystal display (FLCD) devices.

2. Discussion of Prior Art

Such devices are formed by a thin layer of a chiral smectic liquid crystal material contained between two cell walls. The walls carry electrode structures, e.g. row and column electrodes forming an x,y matrix of addressable pixels. Electrical voltages are applied to the row and column electrodes in sequence so that all pixels are addressed in sequence. Prior to assembly, one or both of the inner faces of the cell wall are treated to an alignment treatment that provides both alignment direction and an amount of surface tilt to contacting liquid crystal material. Typical chiral tilted smectic materials have the following phases with decreasing temperature:—isotropic-cholesteric-smectic A–S*, where the asterisk denotes chirality and the smectic phase is tilted smectic such as smectic C, smectic I, etc.

One known type of FLCD is a surface stabilised (SSFLCD) device which is a bistable device. Switching between its two stable states is by application of a dc pulse of appropriate sign, amplitude, and time duration. Smectic liquid crystal molecules can be envisaged as rotating around the surface of a cone as they switch; the cone angle varies with material. Some devices show a minimum in their voltage vs. time switching characteristics (so called τv minimum). Such a device and a typical addressing scheme is described in GB-2,232,802.

It is known that FLCD can show a patchy appearance due to the smectic liquid crystal materials forming into a mixture of two different micro layer arrangements known as the $C_1$ and $C_2$ states (ref. J. Kanbe et al Ferroelectrics (1991) vol 114, pp 3). These micro layers are chevron shape and the angle between cell wall and micro layer tilt angle can be indicated by δ. Both $C_1$ and $C_2$ can form as the material cools down from an isotropic state during manufacture; boundaries between these two states may be indicated by the known zigzag defect. Also, the two different states may form in a completed device, due to shock, e.g. mechanical damage when dropped or by application of too high an electric field etc.

Devices with a single state are required; preferably alignment in the $C_2$ state is obtained since this allows a faster switching at lower voltages. It has been a problem for several years to provide a clear, defect free device. Existing solutions include devices where only the $C_1$ state occurs as in U.S. Pat. No. 5,543,943 Hanyu et al. It is also known to use a high surface tilt ξ GB-2,210469, U.S. Pat. No. 4,977,264, to provide a device free of zigzag defects. GB-A-2,274,519 describes selection of a $C_2$ state by a surface pretilt ξ equal to or greater than 10°, a chevron angle δ in the range 2° to 15°, a one half chiral smectic cone angle $\theta_c$, such that $\theta_c - \delta \geq \xi$.

Good and consistent alignment is necessary for good devices. There are several ways of providing alignment. For example the walls may be coated with a polymer then unidirectionally rubbed, silicon oxide may be evaporated on to the cell (the so called oblique evaporation technique), and grating surfaces (formed by embossing or by photolithographic techniques). Such alignment treatment both give an alignment direction and a surface tilt to liquid crystal molecules in contact with the treated surface; this may be termed a surface alignment induced pretilt and given the symbol ξ; conventionally the pretilt is measured in a nematic phase. It is known to use long pitch in a cholesteric phase above the smectic phase e.g. GB-2,209,610, U.S. Pat. No. 5,061,047, GB-2,210,468B to improve alignment in the chiral smectic phase.

SUMMARY OF THE INVENTION

According to this invention the above problem is alleviated by a combination of material characteristics, surface alignment induced pretilt and alignment anchoring energy. Additionally, a voltage may be applied to the cell whilst the material is held at a reasonably constant temperature at or below a phase transition to a chiral smectic phase and above a device operating temperature range.

According to this invention a liquid crystal device comprises;

a liquid crystal cell including a layer of ferroelectric smectic liquid crystal material contained between two walls bearing electrodes and surface treated to give both an alignment and a surface tilt to liquid crystal molecules;

the surface pretilt ξ is equal to or greater than θ−|δ| over a device operating temperature range, a ratio of azimuthal to zenithal anchoring energies β/α of at least 0.05 and a positive energy difference $\Delta W_s$ between the liquid crystal director at the surface in the $C_1$ and $C_2$ states the arrangement of angles and energies being arranged to cooperate so that the liquid crystal material preferentially adopts the $C_2$ state at device operating temperatures.

This may be achieved by careful control of the surface alignment properties by suitable election of material, rubbing strength, and baking temperatures. For example β is high on surfaces that have been strongly rubbed (pressure and time), whereas α may be varied by choice of polymers (and possibly surfactants) to give the required surface free energy. The ration β/α may be higher than 0.05, e.g. 0.1 or more.

The smectic layers form the C2 chevron geometry in which the component of the layer normal at each surface which is parallel to the surface normal has opposite sign to the component of the liquid crystal molecular director n at the pretilt and in the preferred alignment direction.

This is achieved by ensuring that the pretilt ξ is close to θ−|δ| (where θ is the smectic C cone angle and δ is the smectic layer tilt angle) at some temperature ($T_2$) in the smectic C phase above an operating range (e.g. −10 to 60°, preferably 0 to 40° C.) and uniformly throughout the device. Preferably ξ≧θ−|δ| within about 5° of smectic phase transition $T_1$.

Having obtained the desired C2 state it is maintained by ensuring ξ≧θ−|δ|, preferably ξ>θ−|δ|, across the temperature range for operation.

Preferably $\Delta W_s$ and the ratio β/α are as large as possible. For a given value of β/α, the pretilt ξ is optimised to give $\Delta W_s$ positive and as large as possible across a temperature range of operation. Preferably the material changes from a $C_1$ state to a $C_2$ as close to a smectic A to a chiral smectic phase transition ($T_1$) as possible, e.g. within 10° C. or less.

The device may further comprise means for applying voltages to row and column electrodes in the cell whereby the complete device may be addressed.

The device may further include means for heating the cell, allowing the cell to cool a predetermined temperature, and means for applying an ac voltage across the liquid crystal layer for a predetermined time. After the heating, the cell may then be cooled to ambient at a controlled rate. Such treatment may be performed to remove damage to alignment within the cell, e.g. caused by impact or other mishap subsequent to device manufacture.

According to this invention a method of making a ferroelectric liquid crystal device comprises the steps of:

providing a liquid crystal cell having a layer of a chiral smectic liquid crystal material contained between two cell walls bearing electrodes and surface treated to provide both an alignment direction and a surface pretilt to liquid crystal molecules;

providing a surface treatment giving a pretilt $\xi$ and a ratio of azimuthal to zenithal anchoring energies $\beta/\alpha$ which gives a positive energy difference $\Delta W_s$ between the liquid crystal director at the surface in the $C_1$ and $C_2$ states whereby the liquid crystal material preferentially adopts the $C_2$ state at device operating temperatures;

heating the liquid crystal material to a phase above a smectic phase and introducing the liquid crystal material between the cell walls;

cooling the liquid crystal material to around or just below the phase transition to a chiral smectic phase, applying an ac voltage across the liquid crystal layer sufficient to cause formation of a $C_2$ structure without causing formation of quasi bookshelf layer configuration, removing the voltage and cooling the liquid crystal material down to ambient temperature.

The voltage may be an ac voltage of between 0.1 to 10 volts, typically 2 volts, at a frequency of between 1 to 500 Hz typically 50 Hz.

The application of the voltage at the phase transition may be at the time of initial introduction of the liquid crystal material between the cell walls, or at a later time. In the later case the material will be reheated up to above the smectic phase and cooled in two stages with an intermediate application of voltage as above. Such an action may also be employed to repair cells damaged e.g. by shock or vibration, or over heating, or electrical damage. The step of finally sealing the liquid crystal material between the walls may be after the material has cooled down to ambient temperature.

The application of an ac voltage may be at a temperature just below the phase transition or within a few degrees below the transition depending upon the material; e.g. within 10° preferably less than 5° below the transition.

Additionally, and/or instead of the applied ac voltage, pressure and/or vibration may be applied to the cell at around the $T_2$ temperature. The effect of ac voltage, pressure, and vibration may be to cause movement within the layer so that the preferred lower energy $C_2$ state is obtained at the lower temperatures of the device operating range.

The liquid crystal material may be a chiral smectic material such as smectic C, I, H, etc. or antiferro electric materials, and may have the following phases with decreasing temperatures:

isotropic-cholesteric-smectic A-chiral smectic-(with or without additional higher order smectic phase(s))—solid.

The material in the cholesteric phase may be a compensated material with a long pitch just above the cholesteric to smectic phase transition. Such a material is described in GB-2,209,610, U.S. Pat. No. 5,061,047. For some materials the cholesteric or the smectic A phase may be missing.

BRIEF DESCRIPTION OF DRAWINGS

The invention will now be described, by way of example only with reference to the accompanying drawings of which:

FIG. 17 is a graph of log time of applied voltage pulse against log voltage applied, showing the switching characteristics of a typical FLC smectic liquid crystal material operating in a $\tau V_{min}$ mode;

FIG. 18 shows data, and strobe, waveforms for applying to the display of FIG. 1 to address the display;

FIG. 19 shows resultant waveforms for applying to the display of FIG. 1 to address the display;

DETAILED DESCRIPTION OF INVENTION

Figure 1:
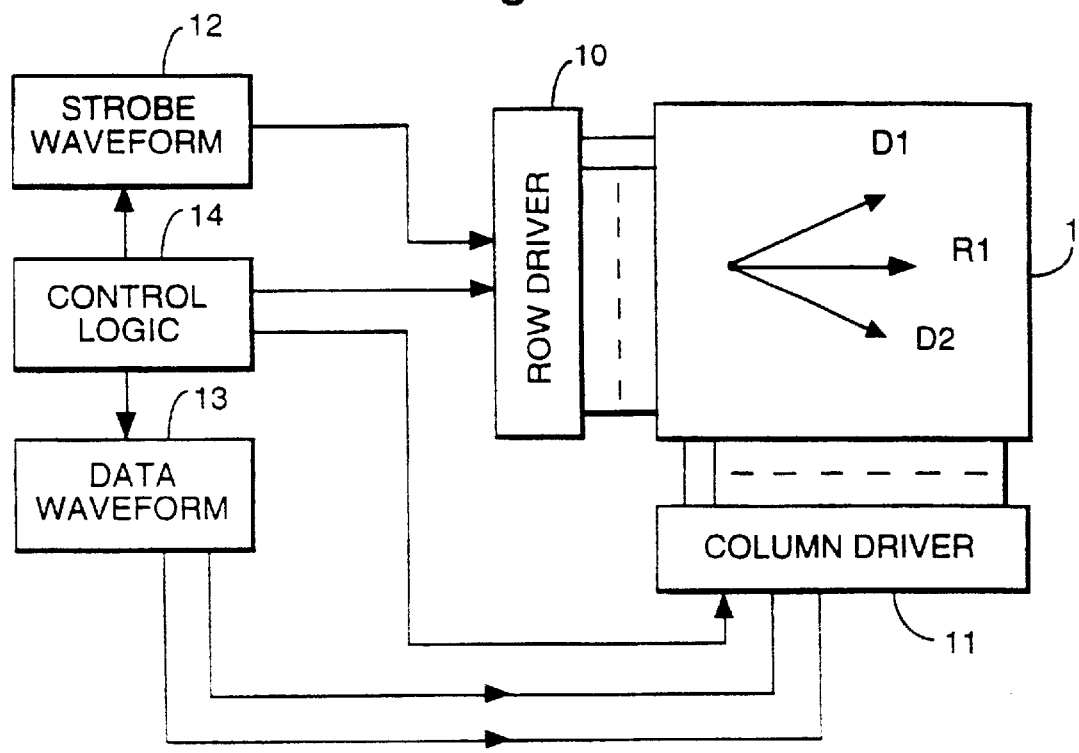
FIG. 1 is a diagrammatic view of an x,y display with row and column drivers.
Figure 2:
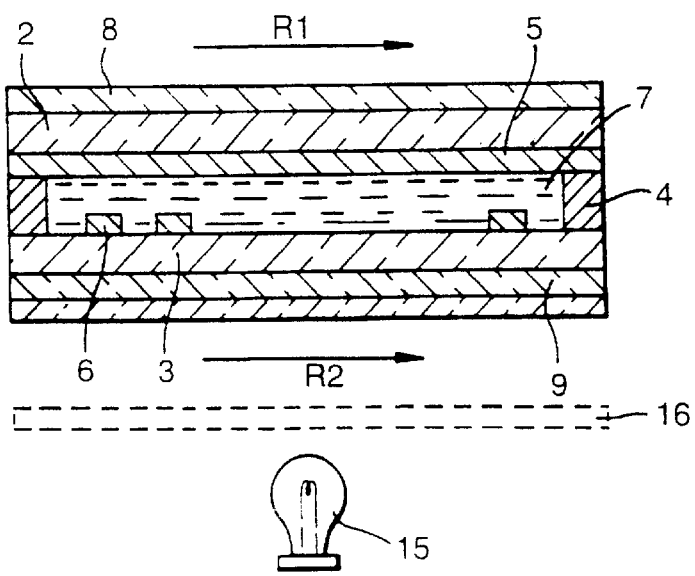
FIG. 2 is a cross section of the display cell of FIG. 1.

The display cell 1 shown in FIGS. 1, 2 comprises two glass walls 2, 3 spaced about 1–6 $\mu$m apart by a spacer ring 4 and/or distributed spacers.

Electrode structures 5, 6 of transparent tin oxide are formed on the inner face of both walls. These electrodes are shown as row and column forming an X, Y matrix but may be of other forms. For example, radial and curved shape for a polar co-ordinate display, or of segments form for a digital seven bar display, or plain sheet electrodes to form an optical shutter.

A layer 7 of liquid crystal material is contained between the walls 2, 3 and spacer ring 4.

Polarisers 8, 9 are arranged in front of and behind the cell 1. Row 10 and column 11 drivers apply voltage signals to the cell. Two sets of waveforms are generated for supplying the row and column drivers 10, 11. A strobe waveform generator 12 supplies row waveforms, and a data waveform generator 13 supplies ON and OFF waveforms to the column drivers 11. Overall control of timing and display format is controlled by a control logic unit 14.

Prior to assembly, the walls 2, 3 are surface treated by spinning on a thin layer of polymeric material such as polyimide or polyamide, drying and where appropriate curing; then buffing with a soft cloth (e.g. rayon) in a single direction $R_1$, $R_2$. This known treatment provides a surface alignment for liquid crystal molecules. In the nematic and cholesteric phases and in the absence of an applied electric field the molecules at the surface walls 2, 3 align themselves along the rubbing direction $R_1$, $R_2$ and at a pretilt angle $\xi$ of about e.g. 2° to 10° to the surface as described more fully below.

The rubbing directions $R_1$, $R_2$ are substantially parallel and in the same direction (for some devices $R_1$ and $R_2$ may be some degrees away from parallel). The sample is aligned by cooling through the higher temperature phases to the required ferroelectric phase. When suitable unidirectional voltages are applied the molecules (more corectly the director n) in the bulk of the material tend to align along one of two directions $D_1$, $D_2$ depending on polarity of the voltage. Typically the angle between $D_1$, $D_2$ is about 45°, but varies with material and the amount of ac bias applied during addressing.

The surface alignment treatment is arranged to provide the required value of pretilt $\xi$, for reasons discussed in more detail later. The material polyimide (e.g. Polyimide 32) when rubbed gives a typical pretilt of about 2°; the actual value depends upon liquid crystal material and the processing. Alternatively, as described in GB-A-2,286; GB-A-2,286,467; GB-A-2,286,894; GB-A-2,2986,893, the cell walls may have formed thereon grating structures which provide a range of pretilt angles and alignment directions. The granting may be symmetric and/or asymmertric in profile, and shaped to give any desired value of pretilt $\xi$, and azimuthal and zenithal anchoring energies $\beta$, $\alpha$ respectively.

The device may operate in a transmissive or reflective mode. In the former light passing through the device e.g. from a tungsten bulb 15 is selectively transmitted or blocked to form the desired display. In the reflective mode a mirror 16 is placed behind the second polariser 9 to reflect ambient light back through the cell 1 and two polarisers. By making the mirror 16 partly reflecting the device may be operated both in a transmissive and reflective mode.

Pleochroic dyes may be added to the material 7. In this case only one polariser is needed and the layer thickness may typically be 4–10 $\mu$m.

On manufacture, a liquid crystal cell 1 is filled with the material 7 heated to its isotropic phase, and drawn in by capillary attraction in a conventional manner. The cell may be subjected to an applied voltage as follows. The cell is then allowed to cool, e.g. at between 0.1 to 1.0° C. per minute, from the isotropic phase until just below the smectic A to chiral smectic phase. The cell is kept at this temperature for about 20 to 120 typically 60 seconds whilst an ac voltage of typically between 0.5 and 5.0 volts e.g. 2 volts (rms.) at 1 to 500 Hz e.g. 50 Hz. The voltage is then removed and the cooling continued. Upon removal of the voltage the cell adopts the $C_2$ state, as described below.

Figure 3:
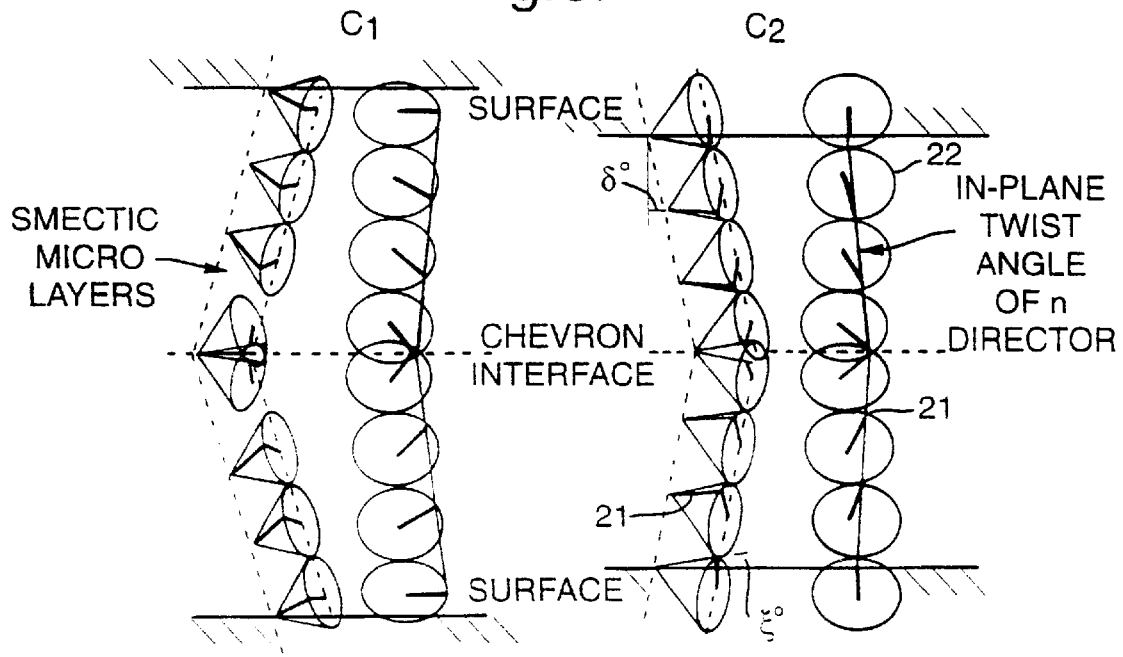
FIG. 3 is a schematic view of a layer of ferroelectric liquid crystal material, showing two alignment configurations, the $C_1$ and the $C_2$ states.

As the material cools the molecules form into micro layers 20 which may be bent as shown in FIG. 3. Two possible different arrangement of bent layers can form and are given the known descriptors $C_1$ and $C_2$. In many cells both $C_1$ and $C_2$ can occur in different parts of the cell; they appear visibly different thereby degrading device appearance.

Figure 4:
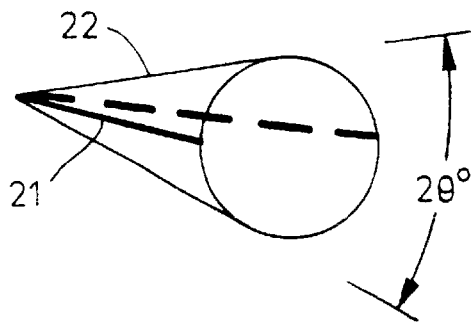
FIG. 4 is a schematic view showing movement of a liquid crystal director around the surface of a cone as the director is switched by application of a suitable voltage-time product.

Molecules (i.e. the director $\underline{n}$) 21 tend to lie as if on the surface of a cone 22, seen more clearly at FIG. 4. Adjacent the cell walls 2, 3 strong aligning forces anchor the molecules 21 in a tilted and aligned direction, away from the walls the molecules tend to arrange themselves as shown in one of two stable positions on the cone approximately in the plane of the layer 7. When a dc electric field of appropriate polarity amplitude and time is applied there is a coupling between the molecule and the field and the molecules 21 rotate around the cone 22 from one switched position (shown in solid lines) to the other switched position (shown in broken lines), i.e. maximum rotation in the plane of the layer 7 is twice cone angle (2$\theta$).

The angle of the cone 22 around which the molecule 21 rotate is the cone angle $\theta$, the angle between a cell wall 2, 3 normal and a micro layer 20 is herein defined as $\delta$, the angle of molecules at a cell wall is herein defined as the surface tilt or pretilt angle $\xi$. Note, the pretilt angle $\xi$ (in the e.g. rubbing direction R) provided by the surface alignment is slightly different than the surface angle when in a cell and lying on the surface of the cone 22 (and to one side of the e.g. rubbing direction R). The energy required by molecules to adopt a particular arrangement depends upon material characteristics and the surface treatment applied to the cell walls. This is explained in part in the FIGS. 5–12 as follows.

Figure 5:
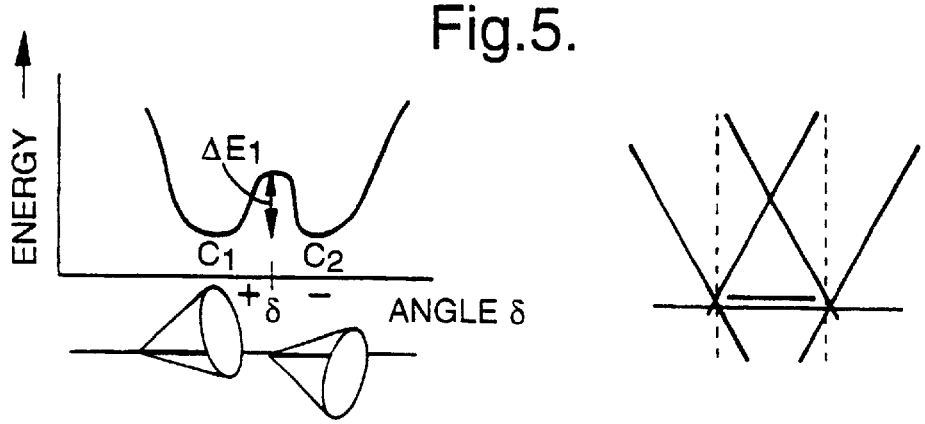
FIGS. 5, 6, and 7 show energy plots against micro layer tilt $\delta$, indicating relative positions of the two states $C_1$ and $C_2$.
Figure 5:
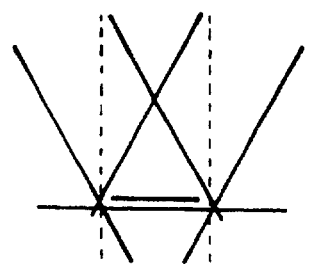

FIG. 5 shows a plot of energy against micro layer angle $\delta$ for a cell where surface pretilt $\xi$ is zero. Two equal energy minima occur at $\delta \cong +/- \delta_0$ corresponding to the $C_1$ and $C_2$ states. Between these minimum values is a barrier of $\Delta E1$. When a liquid crystal material is cooled, the material may adopt one or both of these $C_1$ and $C_2$ states because they are equally favoured as far as energy levels are concerned in some devices.

Figure 6:
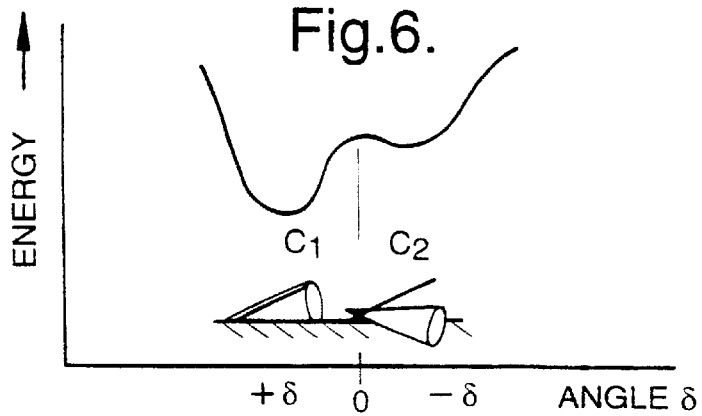

FIG. 6 is similar to FIG. 5 but the energy level for state $C_1$ is lower than for $C_2$. Therefore state $C_1$ will be favoured on cooling. This will occur just below a smectic A to chiral smectic phase transition where $\xi >> \theta - |\delta|$ and $\xi \leq \theta + |\delta|$ as explained with reference to FIG. 8 below.

Figure 7:
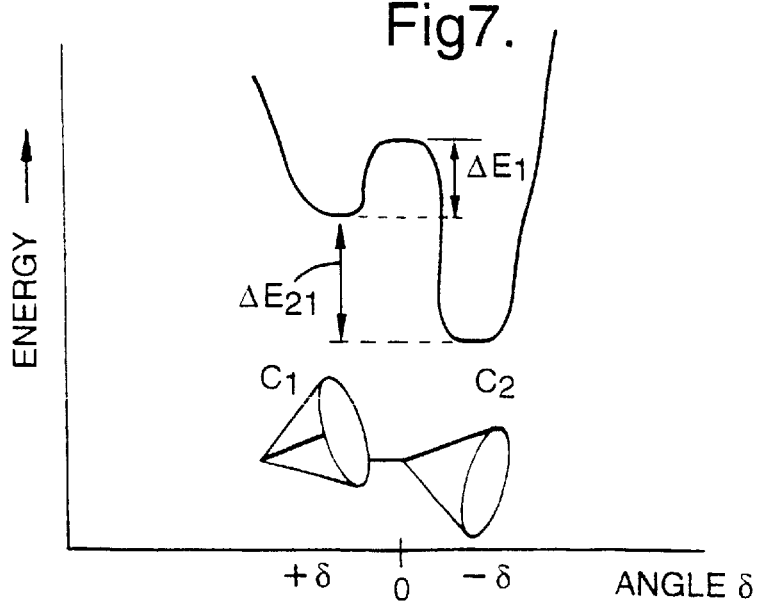

FIG. 7 is similar to FIG. 5 but the energy level for state $C_2$ is lower than for $C_1$. When $\xi > \theta - |\delta|$, state $C_2$ will be favoured on cooling.

The present invention provides a cell where state $C_2$ will be favoured on cooling. This is achieved by use of materials with the desired characteristics, surface tilt treatment. Additionally an ac electric potential may be applied across the layer 7 during device manufacture.

Figure 8:
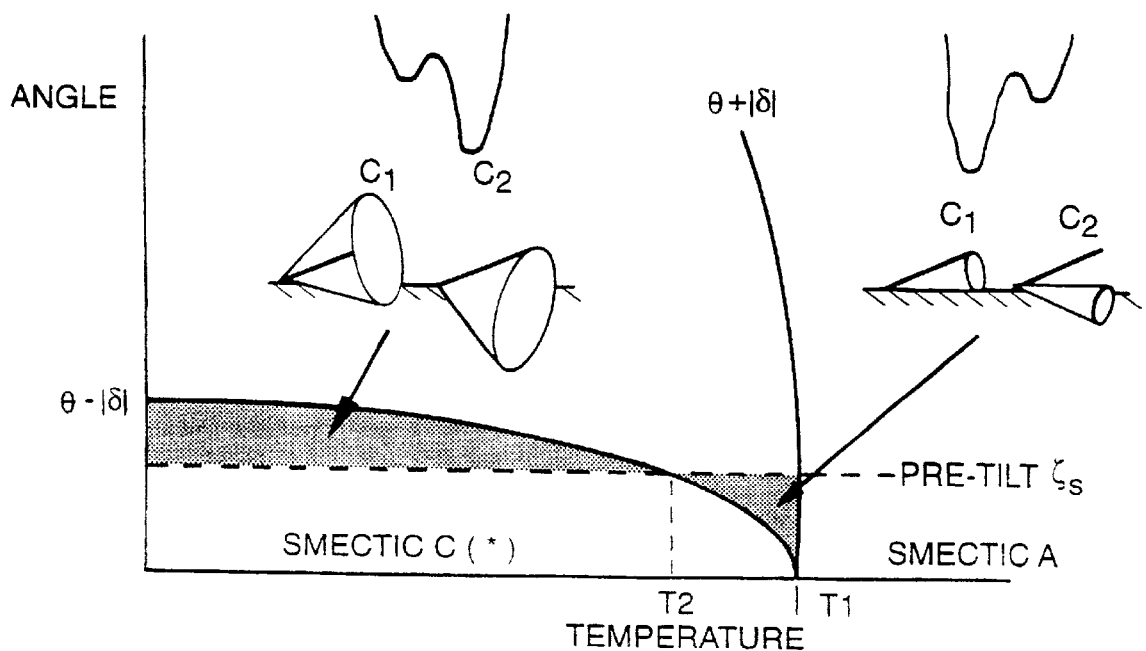
FIG. 8 is a plot showing how the $C_1$ and $C_2$ states are favoured at different temperatures for one value of surface pretilt $\xi$.

FIG. 8 shows how the characteristic $\theta - |\delta|$ and $\theta + |\delta|$ varies with temperature for a typical material in a typical prior art cell. For simplicity it is assumed that the surface pretilt is $\xi$ and does not vary although as in the present invention surfaces may be chosen where this is not the case. The material has a smectic A phase immediately above the chiral smectic phase $S_C^*$. Immediately below the phase transition $T_1$, the values of $\xi-(\theta-|\delta|)$ are positive and a $C_1$ state forms which remains until $\xi \approx \theta-|\delta|$ at a temperature of $T_2$. Below this temperature $T_2$ $\xi<\theta-|\delta|$ and the $C_2$ state preferentially forms.

In conventional devices to provide a $C_2$ state the surface tilt $\xi$ is arranged to be close to $\theta-|\delta|$ at ambient temperature. Unfortunately, for typical devices this requires a low value of surface tilt $\xi$, and leads to the co existence of $C_1$ and $C_2$ states. In GB-2,274,519-A, the $C_2$ state is obtained by application of a low frequency and low voltage AC waveform to the device. The effect of the waveform is to change the chevron angle $\delta$ and allow the material to change from $C_1$ to $C_2$ states when high (e.g. greater than 10°) surface tilt $\xi$ angles are used.

To provide the desired $C_2$ state the $C_2$ energy state must be lower than that of the $C_1$ state, i.e. $\Delta W_s$ is positive and the energy barrier $\Delta E_1$ (FIG. 5) between the two levels must be low enough to allow any part of the material in a $C_1$ state to change to the $C_2$ state. This achieved by a combination of the surface tilt $\xi$, the ratio $\beta/\alpha$, at working ambient temperatures, and the temperature during formation of the $C_2$ chevron structure.

Figure 10:
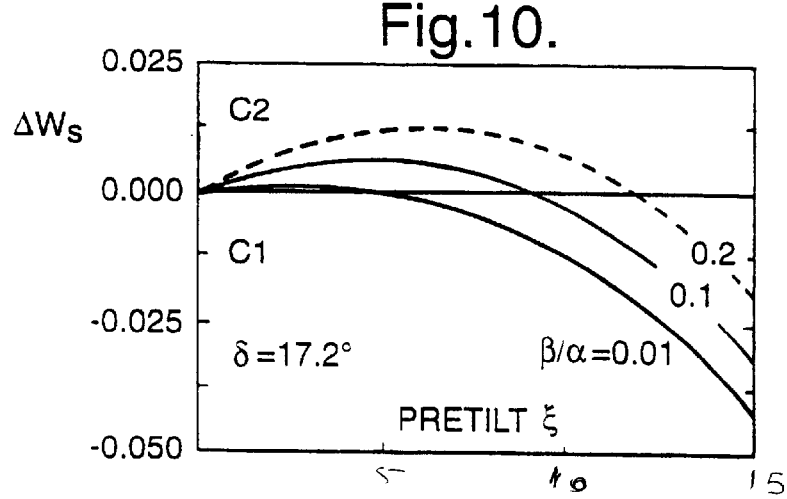
FIGS. 10, 11 are plots showing the difference in surface energy $\Delta W_s$ between $C_2$ and $C_1$ against surface pretilt $\xi$ for one material with different values of $\beta/\alpha$ at two different micro layer angles $\delta$.
Figure 11:
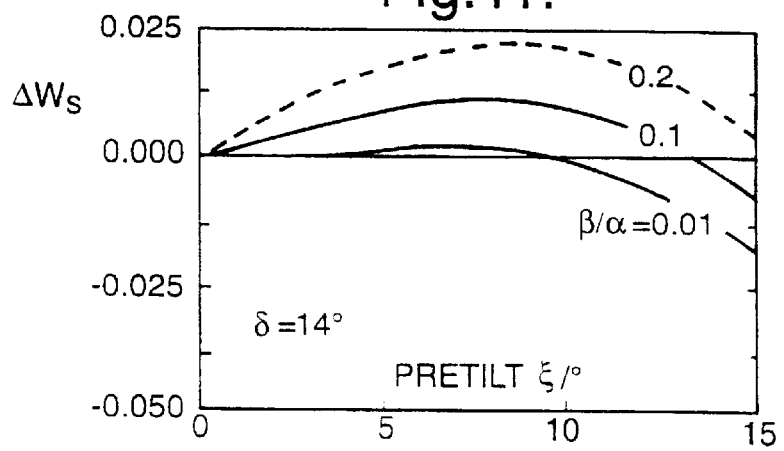

Conventionally to obtain a $C_2$ state $\xi_0<\theta-|\delta_0|$ (below the bottom curve in FIG. 20), and so the maximum value of $\Delta W_s$ would be expected to be less than 3° for FIG. 10 and less than 6° for FIG. 11. In FIG. 10 (where $\theta-|\delta_0|=3°$) the maximum $\Delta W_s$ occurs at about 6° with a $\beta/\alpha$ ratio of 0.2; in FIG. 11 (where $\theta-|\delta_0|=6°$) the maximum $\Delta W_s$ occurs at about 8° with $\beta/\alpha$ ratio of 0.2. However, this shows $\Delta W_s$ maximum when in the $C_2$ state. What must also be considered is the ability of the material to adopt the $C_2$ state on cooling and at a temperature well above the operating range.

Ideally, the $C_2$ state should form spontaneously on cooling at some temperature well above the desired operating range and close to the transition temperature $T_2$, for example within 5° of the phase transition. At this phase transition the material is more mobile and can change from the $C_1$ state to the $C_2$ more readily than at lower temperatures.

Part of the reason for this mobility is that the energy barrier $\Delta E_1$ (FIG. 5) between the two states varies with temperature. At temperatures close to the phase transition $T_1$, the energy barrier is low and increases with decreasing temperatures. Therefore transition to a $C_2$ state in enhanced by a low $\Delta E_1$ and large positive values of $\Delta W_s$ just below $T_1$. Across the operating temperature range (well below $T_2$) it is required that the energy difference $\Delta W_s$ is positive and as high as possible so that the sample is uniformly $C_2$ across the device, despite irregularities which may occur due to surface variations, the spacers, electrode edges etc. Thus in an operating temperature range, the state $C_2$ will be retained even though $\xi_0>\theta-|\delta_0|$.

As shown in FIG. 10, $\Delta W_s$ is maximised with a high $\beta/\alpha$, and a pretilt of about 6° which is substantially above $\xi=\theta-|\delta|=3°$. However, as seen in FIG. 8, close to the smectic C* to smectic A phase transition at $T_1$, $\theta-|\delta|$ is low for typical materials, growing continuously from zero at the phase transition at $T_1$. Thus, (since $\theta-|\delta|$ is less than $\xi$ just below $T_2$), $C_1$ always forms first, and the $C_2$ state may become favourable at some lower temperature (as $\theta-|\delta|$ becomes greater than $\xi$). Therefore increasing $\xi$ (as shown in FIGS. 10, 11 to maximise $\Delta W_S$ in the $C_2$ state) will reduce the ability of the material near the transition $T_1$ to change from $C_1$ to $C_2$ (FIG. 8), and lower the $T_2$ value towards the device operating range.

There is therefore a conflict between the requirements to obtain a maximum $\Delta W_s$ in a range of operating temperature and to obtain a change of state from $C_1$ to $C_2$ just below the phase transition at $T_1$.

At operative temperatures material properties are "fixed", e.g. $\theta \approx 22°$, and $\delta \approx 19°$. The ratio $\beta/\alpha$ should be as high as possible but this is difficult to control and is typically about 0.2. FIG. 10 shows that optimum pretilt is high and about 6°. Thus pretilt of $\xi=6°$ is needed to get a uniform and stable $C_2$ state across a device operating temperature range. However, on cooling, it is necessary to get into the $C_2$ state close to the phase transition $T_2$ where change in alignment will be easy and so that $C_2$ occurs across a maximum temperature range. With conventional materials and surface pretilt of $\xi=6°$ and $\beta/\alpha=0.2$ will not go into the $C_2$ state close to the transition since pretilt $\xi>>\theta-|\delta|$. Therefore is necessary to increase $\theta-|\delta|$ through change in micro layer tilt $\delta$ (e.g. by use of voltage and/or special material) close to the transition $T_2$, or make the pretilt $\xi$ lower just below the transition $T_2$, but higher in the device operating temperatures.

Preferably the value of $\theta-|\delta|$ close to the phase transition temperature $T_1$ is deliberately made closer to the pretilt $\xi$ value (or visa versa), thereby enabling the $C_1$ to $C_2$ alignment transition to occur, preferably as close to $T_1$ as possible. Once this is achieved, the values of $\theta-|\delta|$ may be allowed to increase as the temperature decreases, to be the same as in conventional devices or even higher, and the pretilt much higher than previously used. Hence a more uniform and stable $C_2$ state is achieved.

Figure 12:
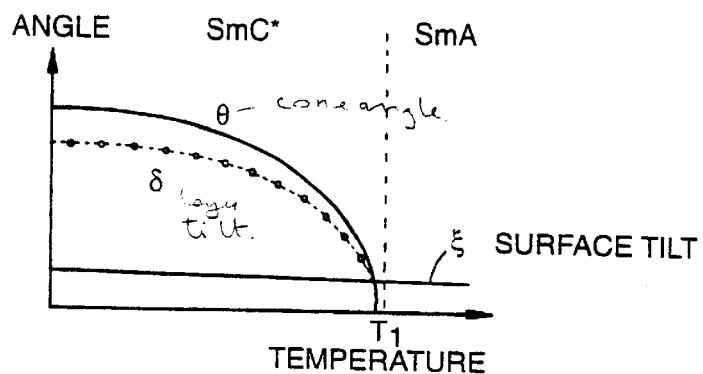
FIG. 12 is a graph showing how smectic cone angle $\theta$, and micro layer tilt angle $\delta$ varying with temperature for a typical material when the surface pretilt $\xi$ remains at a constant value.
Figure 13:
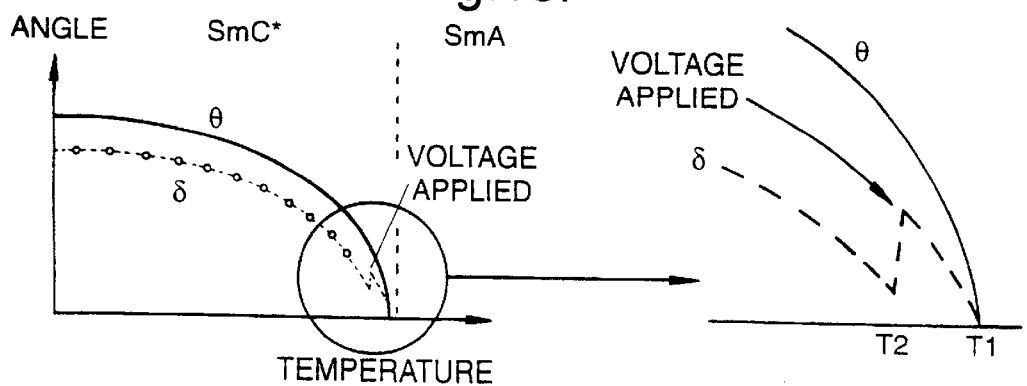
FIGS. 13a, b, show how the value of micro layer tilt angle $\delta$ in FIG. 12 may be altered by application of an ac voltage to enhance change of material from the $C_1$ to the $C_2$ state.

This is explained with reference to FIG. 12 which is a plot of angle against temperature showing how $\theta$ varies from zero at the smectic A to smectic C* transition at $T_1$ to e.g. 25° at ambient temperature for a typical device. Also shown is a plot of $\delta$ which is normally a constant fraction of $\theta$, (e.g. $\delta \approx 0.85\theta$). Ideally $\delta$ should vary just below $T_2$ and may be achieved in several ways. For example:

(1). Apply a voltage across the liquid crystal layer 7 whilst the material is at a temperature immediately below the transition temperature $T_1$ to lower the layer tilt angle $\delta$, thereby increasing $\theta-|\delta|$ towards $\xi$ This is shown in FIG. 13 where the value of $\delta$ decreases substantially as a voltage is applied at $T_2$.

Figure 14:
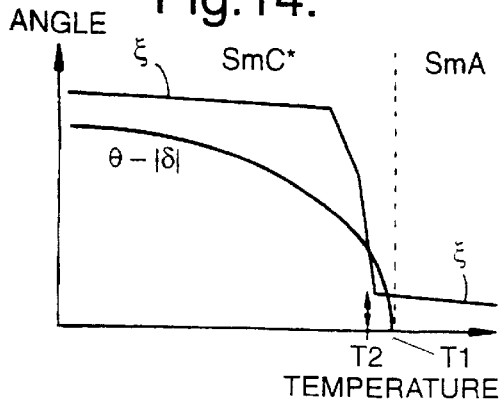
FIG. 14 shows how the value of surface pretilt $\xi$ may be varied with temperature, compared with a $\theta-|\alpha|$ curve.

(2). Use surface alignment treatment and liquid crystal materials with a temperature dependent pretilt so that $\xi$ low (i.e. $\xi \approx \theta-|\delta|$) close to the phase transition at $T_1$ but $\xi$ is higher across the operating temperature range below $T_2$. This is shown in FIG. 14 where $\xi$ increases gradually as the temperature drops to $T_2$, then increases rapidly on further cooling. An example of such a surface alignment treatment is described by V. N. Raja et al (1996) MLCC 287, pp 169–175, which uses a rubbed surface of a liquid crystal polymer LCP100 (available from E Merck)

Surface director interaction can be explained as follows (Ferroelectrics, 1996, Vol 178, pp 155–165):

The surface interaction is complicated in the SmC* phase by the effects of the biaxiality and ferroelectricity. For simplicity, a uniaxial nematic-like surface energy, $W_S$ is assumed, which has the form:

$$W_S=\alpha(n.s)^2+\beta(n.t)^2-\gamma(n.s)\cdot(n.r)$$

where s is the surface normal, r is in the plane of the substrate and parallel to the preferred direction of n, and t is defined by r x s, as shown in FIG. 3a. This energy is similar to that used previously but is rewritten in a form so that coefficients $\alpha$ and $\beta$ correspond to the zenithal and azimuthal anchoring energies, respectively, and $\gamma$ is related to the pretilt.

In the nematic phase, a director at an in-plane twist angle $\eta$ and out-of-plane tilt angle $\xi$ has the surface energy:

$$W_S=\alpha \sin^2 \xi+\beta \cos^2 \xi \sin^2 \eta+\gamma \sin \xi \cos \xi \cos \eta$$

Defining the minimum energy orientation in the (s,r) plane at the pretilt angle $\xi_s$ leads to:

$$\tan 2\xi_s = -\frac{\gamma}{\alpha}$$

In the smectic C (*) phase, the director is constrained to lie on a cone, tilted with respect to the surface normal at the layer tilt angle δ, as shown in FIG. 3b. The surface energy is then given by:

$W_s = \alpha(\cos \delta \sin \theta \sin \phi - \sin \delta \cos \theta)^2 + \beta \sin^2 \theta \cos^2 \phi$ $-\gamma(\cos \delta \sin \theta \sin \phi - \sin \delta \cos \theta) \cdot (\sin \delta \sin \theta \sin \phi + \cos \delta \cos \theta)$ The energy difference for the liquid crystal director at the surface in the $C_1$ and $C_2$ states is defined by:

$\Delta W_s = W_s(\delta = -\delta_0) - W_s(\delta = +\delta_0)$ where $\delta_0$ is the characteristic layer tilt for the material at a given temperature. If $\Delta W_s$ is positive, the $C_2$ state has a lower surface energy than the $C_1$ and is therefore more likely to occur.

Figure 9:
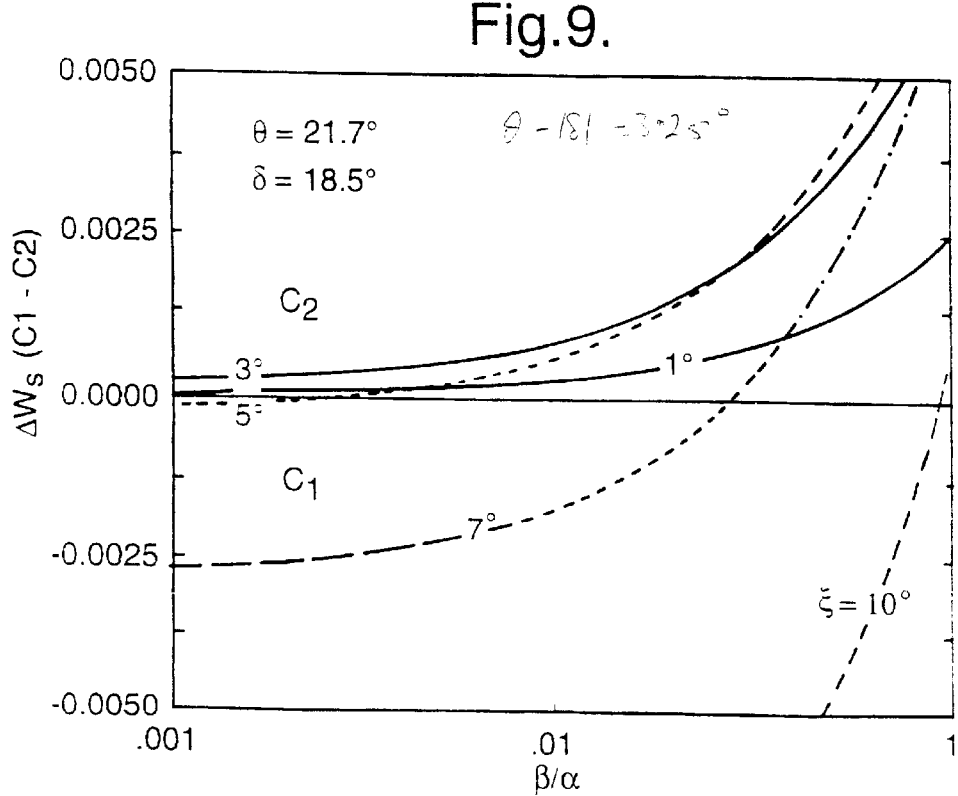
FIG. 9 is a plot of surface energy difference $\Delta W_s$ between the $C_2$ and $C_1$ states against the surface anchoring energy ratio $\beta/\alpha$ for different surface pretilts $\xi$ where $\beta$ is the aximuthal anchoring energy and $\alpha$ the zenithal anchoring energy.

The above relatively simple arguments need to be modified to take into account the effects of surface alignment induced anchoring energies as follows:

The relationship between $\Delta W_s$ and the ratio of the azimuthal to zenithal anchoring energies β/α is plotted in FIG. 9 for several values of pretilts ξ. Above the $\Delta W_s = 0$ line the $C_2$ state exists and below that line the $C_1$ state exists. The material was the commercially available Merck material SCE13; at 30° C., $\delta_0 = 18.5°$, $\theta = 21.75°$, and thus $\theta - |\delta_0| = 3.25°$. FIG. 9 shows that the $C_2$ state is most stable for 3° (i.e. $\xi_0 \approx \theta - |\delta_0|$) for all values of β/α. and for other surface tilt ξ when combined with high values of β/α. For $\xi_0 < \theta - |\delta_0|$, e.g. 1°, the $C_2$ state is always more energetically favourable, but the magnitude of $\Delta W_s$ is relatively small at low β/α values. For $\xi_0 > \theta - |\delta_0|$, e.g. 7°, the $C_2$ state is energetically favourable only for the higher values of β/α. The graph shows that $\Delta W_s$ can be made highly positive for surface tilts ξ much higher than $\theta - |\delta|$. However, if the surface tilt ξ is made too high the $C_1$ state again becomes more stable, i.e. when $\Delta W_s$ is negative as explained with FIG. 20 below.

FIG. 10 shows plots of $\Delta W_s$ against pretilt ξ for varying β/α, when $\theta = 20°$, and $\delta_0 = 17°$, i.e. $<\theta - |\delta_0| = 3°$. FIG. 11 shows plots of $\Delta W_x$ against pretilt ξ for varying β/α, when $\theta = 20°$, and $\delta_0 = 14°$, i.e. $<\theta - |\delta_0| = 6°$. These two FIGS. 10, 11 show how the β/α ratio and surface pretilt ξ may be adjusted to ensure that $\Delta W_s$ is maximised and the $C_2$ state favoured.

Figure 20:
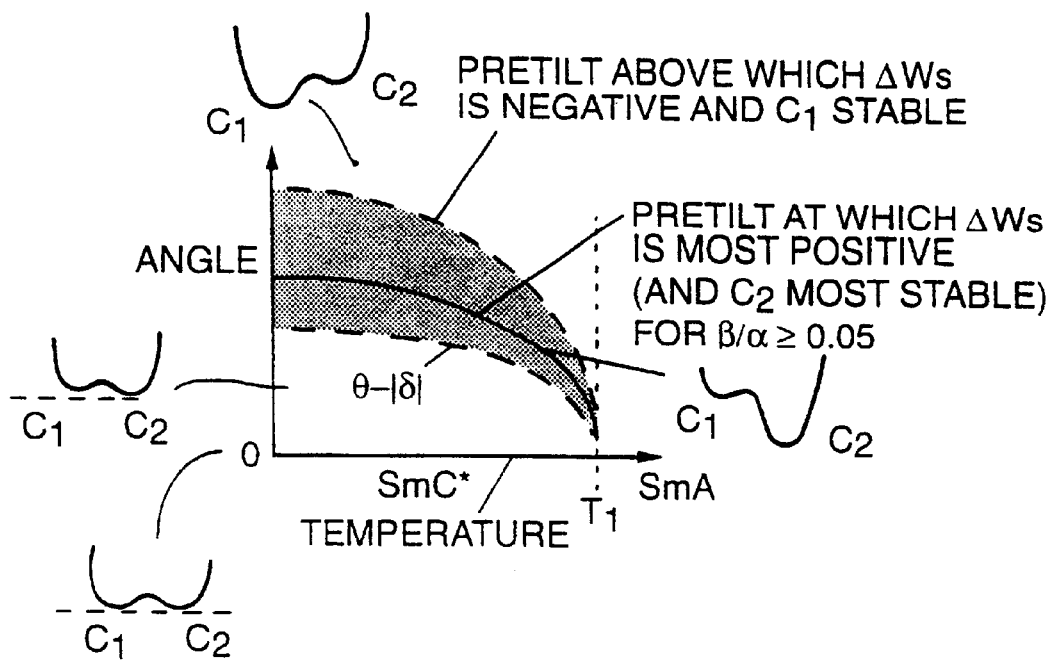
FIG. 20 is a graph of angle against temperature a range over which a $C_2$ can be achieved, and a curve showing pretilt angle $\xi$ at which $\Delta W_s$ is most positive (and hence $C_2$ most stable) for the ratio $\beta/\alpha \geq 0.05$.

Variation of $\Delta W_s$ is shown in FIG. 20 where angle is plotted against temperature. The lower dotted curve shows $\theta - |\delta|$ variation as in FIG. 8. The upper dotted curve shows the surface tilt ξ limit above which $\Delta W_s$ is negative and the $C_1$ state is most stable. The centre solid line curve shows the surface tilt ξ at which $\Delta W_s$ is most positive and therefore $C_2$ is most stable, for the ratio $\beta/\alpha° \geq 0.05$. Stable $C_2$ state operation is therefore obtained with surface tilt ξ between the upper and lower curves. Preferably ξ has a value which follows the centre solid curve.

Figure 15:
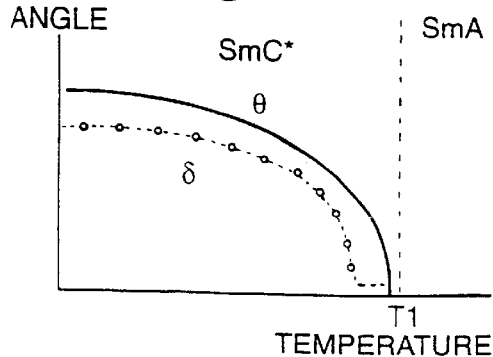
FIG. 15 shows variation of micro layer tilt angle $\delta$ against temperature for a device where $\delta$ is low just below a smectic phase transition, increasing thereafter with decreasing temperature, the value of $\theta$ is also show and is similar to that in FIGS. 12, 13.

(3). Choose FLC materials where $\theta - |\delta|$ is unusually high close to the phase transition. This is shown in FIG. 15 where δ is small just below the phase transition, and increases together with θ as the temperature drops further.

Having achieved high $\Delta W_s$, the stability of the layer geometry to electrical, thermal or mechanical disruption is related to the potential barrier $\Delta E_1$ between the $C_1$ and $C_2$ states. This should be made high to resist or prevent damage or zero so that if damage occurs the layers relax in the $C_2$ state spontaneously These requirements for high $\Delta W_s$ and high potential barrier $\Delta E_1$ between the states require that β/α is high. However, if the potential barrier $\Delta E_1$ is then too high, the material will be "trapped" in the $C_1$ state and the $C_2$ state will either not form at all, or will form in patches with zigzag defects across the sample. For this reason, as explained above, the value of $\Delta E_1$ should be large over a device operating range and be low around $T_2$.

Figure 16:
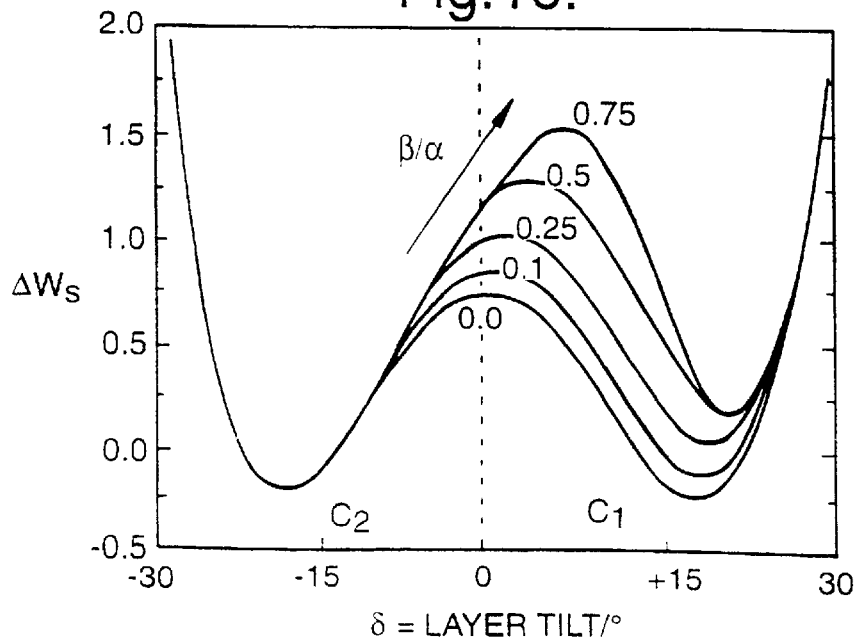
FIG. 16 is a plot of surface energy $\Delta W_s$ against micro layer tilt $\delta$ for different values of $\beta/\alpha$.

FIG. 16 shows surface energy against layer tilt ξ for different β/α. The energy minimum for the $C_1$ state increases with increasing β/α. ratio. Also, the height of the energy barrier $\Delta E_1$ between the two states $C_1$, $C_2$ increases with increasing β/α. These plots are for $\theta = 22.5$, $\delta_0 = 19°$, $\xi_0 = 10°$. From this graph, the values of $\Delta W_s$ and $\Delta E_1$ can be optimised.

EXAMPLES

Example 1

A standard polyimide was prepared as follows (PI-32 processing): Cell walls were coated with adhesive promoter (methanol solvent); PI-32 in NMP solution was spundown on the surface; the coated walls were given an initial bake for 10 minutes at 120° C. followed by full baking at 300° C.; the baked surfaces were rubbed hard with a Rayon cloth. A cell was assembled with rubbing direction parallel, and filled with SCE13 (Merck material), cell spacing 1.4 μm. Surface pretilt was found to be approximately 4° (measured conventionally in a nematic phase). The ration of β/α was 0.2 determined by the method of Jones above.

The cell was aligned by cooling at 1° C. minute from its nematic phase through the smectic A phase into the smectic C phase. It was found that the $S_A$ to $S_C$ transition (to state $C_1$) started to occur at 58.9° C. and the $C_1$ state started to form at 52.6° C. The cell was found to have formed approximately 20% $C_2$ after being cooled to room temperature. The material SCE13 had a value of $\theta - |\delta| \approx 1.5°$ at 45° C. and ≈0.5 at 55° C. The values of θ and δ were found using the method of Anderson et al (1991) J. Phy. D Applied Phys 24, pp 338 at different applied switching fields, including zero.

Example 2

The cell was then realigned several times from the nematic but at 57.5° C. the cooling was suspended for 60 seconds whilst a 50 Hz square wave was applied to the cell. Different voltage levels (including zero for comparative purposes) was applied. The application of the voltage was performed at 57.5° C. since this temperature was between the $S_A$ to $S_C$ * and $C_1$ to $C_2$ transitions. Upon application and removal of the voltage $C_2$ texture could be seen clearly to form over the viewed area of the cell.

It was found that application of no applied voltage led to approximately 20% $C_2$ texture when cooled to room temperature. The application of 0.5 volts at $T_2 = 50°$ C. gave about 60% $C_2$, 1.0 volts gave about 95% $C_2$, and 2.0 volts gave virtually 100% $C_2$ (i.e. only a small number of defects at the edge of a 1 cm² test area).+

The field is then removed and the cell cooled below 57.5° C. to an operating temperature of say 25° C.; the optical extinction angle was found to be approximately the same as for an untreated (without an applied voltage at $T_2$) cell. Hence $\theta - |\delta| \approx 1.5°$ which is substantially lower then $\xi = 3°$ or 4°. Thus the desired result of about 100% $C_2$ was obtained with $\xi = \theta - |\delta|$. This then gave good switching performance associated with a $C_2$ state.

It was also found that application of the equivalent DC voltages led to damage textures, as there was a tendency for the layers to become "bookshelf" geometry, but with the layer normal twisted in the plane of the cell.

Figure 21:
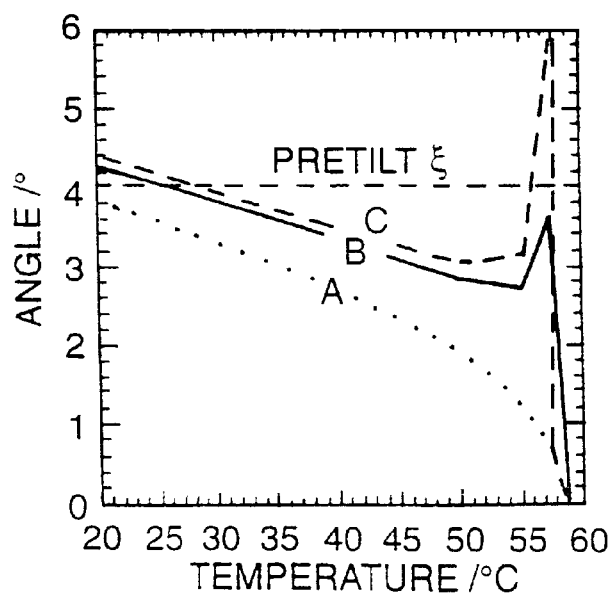
FIG. 21 is a graph of angle against temperature showing a constant pretilt $\xi$, and different values of $\theta-|\delta|$ obtained by application of an ac voltage.

Variation of parameters for the examples 1, 2 are shown in FIG. 21. Surface tilt ξ is constant at 4° over the shown temperature range. Curve A shows the variation of $\theta-|\delta|$ with temperature as in FIG. 8 for the material SCE13. Curve B is similar but on cooling down to 57.5° an ac voltage is applied which causes a change in layer tilt $\delta$ to about 3°. Curve C is similar but with a much higher applied voltage forcing $\delta$ to approach zero. For this curve C defects occurred, associated with a quasi bookshelf type of micro layer configuration.

Example 3

By way of comparison, the previous cell was reheated to the isotropic phase and recooled to the smectic C phase to a temperature of 30° C., whereupon the alignment was predominantly $C_1$ state. This indicates that the temperature $T_2$ occurs within the operating range of temperatures and not just below the phase transition $T_1$.

Application of 50 Hz 20 volts rms. caused significant disruption of the layers. The appearance was patchy and the alignment poor but the cell had undergone considerable "quasi-bookshelf" treatment; extinction angle measurement suggested that many areas gave $\delta \approx 12°$ and the $C_2$ state did not form.

Further experiments were carried out to measure the effect of applied voltages during a constant temperature. It was found that the values of the $\tau V$ curve (FIG. 17) was lowered. This means that lower addressing voltages could be used.

The display of FIG. 1 may be addressed in a conventional manner. For example as described in GB-2,232,802B. U.S. Pat. No. 5,398,042. SSFLCDs switch; between two stable states or molecular directions; a positive pulse will switch into one state and a negative pulse switch into the other state. Typical switching characteristics are as shown in FIG. 17; material is switched by time-voltage products above the curve, any time-voltage product below the curve does not switch.

Strobe waveforms, FIG. 18 are applied to each row electrode in turn. The strobe is formed of pulse pairs, a positive pulse followed by a negative pulse to each row, forming a first field of addressing. This is followed by the invert, i.e. a negative pulse then a positive pulse to each row in turn forming a second field. Two fields are required to completely switch all desired pixels. The column electrodes receive one of two data waveforms all the time. The data waveforms are alternate positive and negative pulses, with Data 1 the inverse of Data 2. One data co-operates with one strobe pulse pair to switch in one direction, whilst the other data co-operates with the other strobe pulse pair to switch in the opposite direction.

The four possible resultant waveforms are shown in FIG. 19; strobe and Data 1 switches with a large positive pulse in the second field, whilst strobe and Data 2 switches with a large negative pulse in the first field. Use of two strobe pulse pairs of opposite polarity, and data waveforms of alternate polarity ensures net zero dc across the liquid crystal material.

What is claimed is:

1. A liquid crystal device comprising:

a liquid crystal cell including a layer of ferroelectric smectic liquid crystal material contained between two walls bearing electrodes and surface treated to give both an alignment and a surface pretilt to liquid crystal molecules;

wherein the surface pretilt $\xi$ is equal to or greater than $\theta-|\delta|$ over a device operating temperature range, a ratio of azumuthal to zenithal anchoring energies $\beta/\alpha$ of at least 0.05 and a positive energy difference $\Delta W_s$ between the liquid crystal director at the surface in the $C_1$ and $C_2$ states the arrangement of angles and energies being arranged to cooperate so that the liquid crystal material preferentially adopts the $C_2$ state at device operating temperatures further comprising means for heating the cell, means for allowing the cell to cool at a predetermined rate to a predetermined temperature, means for applying an ac voltage across the liquid crystal layer for a predetermined time, and means for cooling the cell to ambient temperature at a controlled rate.

2. The device of claim 1 and further comprising means for applying voltages to row and column electrodes in the cell whereby the complete device may be addressed.

3. The device of claim 1 wherein the ratio of $\beta/\alpha$ is at least 0.1.

4. The device of claim 1 wherein the surface pretilt $\xi$ is greater than $\theta-|\delta|$ over a device operating temperature range.

5. The device of claim 1 wherein the surface pretilt $\xi$ varies with temperature to give a high value at ambient temperatures and a lower value at higher temperatures near a smectic phase transition.

6. A method of making a ferroelectric liquid crystal device comprising the steps of:

providing a liquid crystal cell having a layer of a chiral smectic liquid crystal material contained between two cell walls bearing electrodes and surface treated to provide both an alignment direction and a surface pretilt to liquid crystal molecules;

wherein providing a surface treatment giving a pretilt $\xi$ and a ratio of azumuthal to zenithal anchoring energies $\beta/\alpha$ which gives a positive energy difference $\Delta W_s$ between the liquid crystal director at the surface in the $C_1$ and $C_2$ states whereby the liquid crystal material preferentially adopts the $C_2$ state at device operating temperatures;

heating the liquid crystal material to a phase above a smectic phase and introducing the liquid crystal material between the cell walls;

cooling the liquid crystal material to just below the phase transition to a chiral smectic phase;

applying an ac voltage across the liquid crystal layer sufficient to cause formation of a $C_2$ structure without causing formation of quasi bookshelf layer configuration;

removing the voltage and cooling the liquid crystal material down to ambient temperature.

7. The method of claim 6 wherein the ac voltage is between 0.0833 and 50 volts/$\mu$m of layer thickness, and a frequency of between 1 and 500 Hz.

8. The method of claim 6 wherein the cooling is at a rate of between 0.1 and 50° C. per minute.

9. The method of claim 6 wherein the ac voltage is applied for a time between 1 and 120 seconds.

10. The method of claim 6 wherein the ac voltage is applied whilst the liquid crystal material is within the range of the chiral smectic phase transition to about 10° C. below the transition.

11. The method of claim 6 wherein the liquid crystal material is a chiral smectic C in a range of operating temperatures.

12. The method of claim 6 wherein the liquid crystal material has the following phases with decreasing temperatures:

isotropic-cholesteric-smectic A-chiral smectic-solid.

13. The method of claim 6 wherein pressure and/or vibration is applied to the liquid crystal layer at a temperature below but within 10° C. of a smectic phase transition.

* * * * *